United States Patent [19]

Tabuchi et al.

[11] 4,107,533
[45] Aug. 15, 1978

[54] APPARATUS FOR MEASURING A CONCENTRATION OF RADIOACTIVITY

[75] Inventors: Hideho Tabuchi, Kashiwa; Akira Ogushi, Kawasaki, both of Japan

[73] Assignee: Hitachi, Ltd., Japan

[21] Appl. No.: 734,318

[22] Filed: Oct. 20, 1976

[51] Int. Cl.² .............................................. G01T 1/24
[52] U.S. Cl. ................................ 250/364; 176/19 R; 250/370
[58] Field of Search ............... 250/304, 364, 380, 370; 176/19 R, 19 LD

[56] References Cited

U.S. PATENT DOCUMENTS

| | | | |
|---|---|---|---|
| 3,200,041 | 8/1965 | Ralfe et al. | 250/364 X |
| 3,376,200 | 4/1968 | Ward | 176/19 R |
| 3,389,251 | 6/1968 | Rainbault et al. | 250/364 |
| 3,617,709 | 11/1971 | Tone | 250/380 X |

Primary Examiner—Archie R. Borchelt
Attorney, Agent, or Firm—Craig & Antonelli

[57] ABSTRACT

An apparatus for measuring concentration of radioactivity in a fluid circulating in a cooling system or a disposal system, etc. of a nuclear power plant (e.g. coolant), the apparatus having a plurality of sampling tubes with different diameters depending on the intensities of radioactivity, and the sampling tubes having valves for switching from one fluid to another fluid. The sampling tubes are connected to the system to a discharge pipe, and are disposed in the proximity of a radiation detector adapted to issue a signal representative of radiation. The issued signal is supplied to a multichannel pulse height analyzer and a data processing system providing an indication of the concentrations of radioactivities for respective radionuclides.

22 Claims, 2 Drawing Figures

APPARATUS FOR MEASURING A CONCENTRATION OF RADIOACTIVITY

BACKGROUND OF THE INVENTION

The present invention relates to an apparatus for measuring concentrations of radioactivity in cooling lines of water disposal lines, etc. of nuclear reactors or other plants and, more particularly, to an apparatus capable of automatically measuring the concentration of radioactivity in the coolant circulating in the cooling system of a nuclear reactor. Although an explanation will be made hereinafter as to the cooling system of a nuclear reactor, it is to be understood that the apparatus of the invention is applicable also to the water disposal system of the reactor.

The inspection or observation of the concentration of radioactivity in the coolant is important and indispensable for confirming the soundness of fuel elements and checking possible corrosion of fuel cladding, thereby to ensure a good conditioned running of a nuclear reactor.

Conventionally, the measurement of the radioactivity has been made, only when it is required, by at first taking out a small quantity of sample coolant from a predetermined portion of the cooling line, filtering and chemically treating the sample in a laboratory and then measuring the radioactivity by employing a $\gamma$-ray spectrometer. Thus, the conventional method of measuring the radioactivity takes more than one hour from the picking up of the sample to the completion of the measuring, which is inconvenient especially for those radionuclides having short period of half-decay such as $^{138}Xe_{14.2\,min.}$, $^{87}Kr_{76\,min.}$ or $^{134}I_{52.4\,min.}$, since, in case of such radionuclides, the radioactivity at the time of measurement has been considerably decayed and does not represent the actual concentration of the radioactivity.

In addition, in the conventional method of measurement, dilute gases such as Kr or Xe tend to be degassed or released at the time of taking out of the sample coolant, which considerably deteriorates the evaluation of the concentration of the dilute gases. At the same time, the conventional measuring method is likely to cause radioactive contamination of the working environment and the examiner himself.

Moreover, another shortcoming or disadvantage of the conventional method resides in that it cannot suitably follow-up the change in the radioactive intensity of the coolant, which change takes place in accordance with the change in the condition or output of the reactor.

SUMMARY OF THE INVENTION

It is therefore an object of the invention to overcome above-described shortcomings of the prior art by providing an apparatus capable of promptly and automatically measuring the concentration of radioactivity in the coolant, for a wider range of concentration, without requiring the troublesome manual taking-out of the sample coolant.

According to the invention, a conventional tube provided at the cooling line or disposal line for taking out the fluid circulating therethrough is extended to a station or place suitable for the measuring of the radioactivity concentration. A plurality of sampling tubes having different diameters relating to the concentrations of the radioactivity are connected to the extended tube. At both ends of each sampling tube there are provided respective valves for effecting the changing-over between two pipe lines. The sampling tubes are disposed in the vicinity of a radiation detector. The radioactive ray is detected by the detector which in turn delivers a signal representative of the intensity to a multichannel pulse height analyzer and a data processor for analyzing the signal so that the measuring of radioactive concentration may be performed for each of the radionuclides.

The switching or the changing-over of the valves is performed in accordance with the radioactive concentration of the object, by means of a sequence controller.

DESCRIPTION OF THE PREFERRED EMBODIMENT

As has been described, the apparatus of the invention employs conventional tubes or pipes for taking out the sample material, which are extended to a place convenient for the measuring of radioactivity, a plurality of sampling tubes having different diameters in inverse proportion to the intensity of radioactivities, each of the sampling tubes having at its ends respective valves for substituting other non-radioactive substance for the coolant, and a radiation on radioactive rays detector disposed in the vicinity of the sampling tubes or vice versa. A suitable controlling means performs an automatic changing-over of the valves so that the sample is taken out in a flowing or stationary condition, and the detector which is preferably a Ge (Li) $\gamma$-ray detector detects the radiation in the taken-out sample.

The invention will be more fully understood from the following description of a preferred embodiment taken in conjunction with the attached drawings. Although water is particularly referred to, it is to be understood that any other liquid or gaseous coolant material may be substituted for the water.

Figure 1:
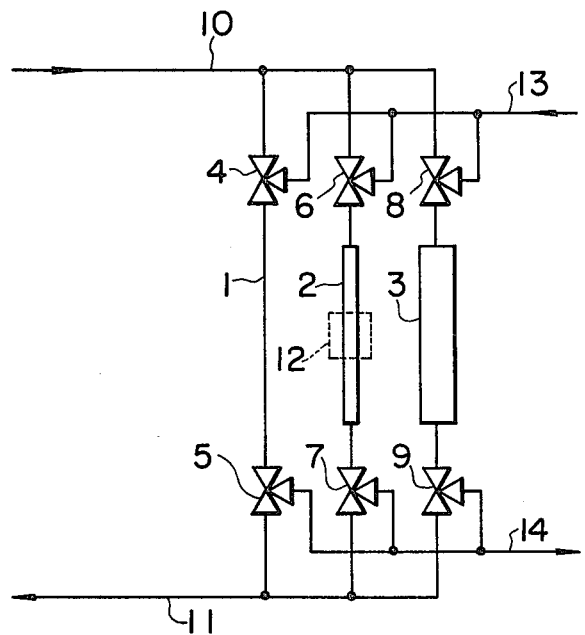
FIG. 1 is a block diagram showing the basic construction of an apparatus of the present invention.

Referring at first to FIG. 1 which shows a basic arrangement of the apparatus of the invention, three sampling tubes 1, 2 and 3 have, respectively, at their both ends, valves 4, 5 and 6, 7 and 8, 9 and are connected to a pipe 10 for feeding the sample coolant water and to a pipe 11 for discharging the water. The sampling tubes are disposed in the vicinity of a semiconductive radiation detector 12. A pipe 13 for providing rinsing or cleaning water (or other non-radioactive fluid) and a pipe 14 for discharging the cleaning water are connected in such a manner that each sampling tube may be switched from the sample water to the cleaning water by simultaneously changing-over the pair of valves 4, 5 or 6, 7 or 8, 9.

Figure 2:
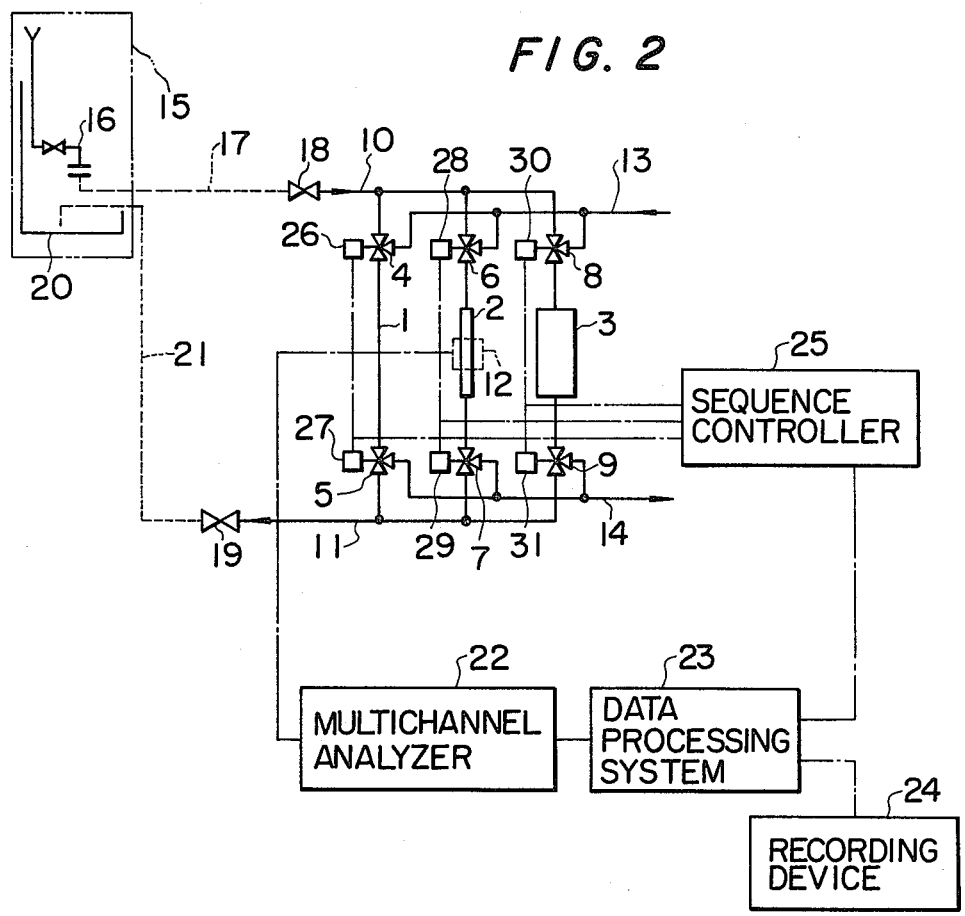
FIg. 2 is a block diagram of an embodiment of the invention.

Referring now to FIG. 2 which shows a practical embodiment of the invention applied to the measurement of radioactivity concentration in the primary circuit of a nuclear reactor, a pipe 16 extending to a conventional sampling equipment 15 is connected by a pipe 17 which reaches a position suitable for the measurement of radiation. A stop valve 18 is provided for maintenance and inspection of the system. At the downstream side of the stop valve 18, the sampling system as shown in FIG. 1 is connected to the pipe 17, which in turn is connected by a pipe 21 leading to a drain tank 20 through a reduction valve 19. A radionuclide analyzer is provided which consists of a multichannel pulse height analyzer 22 adapted to analyze the signal delivered from the semiconductive detector 12, a data processing system 22 and a recorder 24. A sequence controller 25 is adapted to cooperate with valve driving means 26, 27, 28, 29, 30 and 31, in automatically selecting one sampling tube out of the three tubes, in accordance with the detected concentration of radioactivity of the coolant water.

The multichannel pulse height analyzer 22 is capable of transducing the signal representing the radiation energy, which is delivered from the radiation detector 12, to pulse heights of a number of channels (1,000 to 4,000 channels, for example) and counting or sorting the pulses belonging to respective channels. The data processing system 23 is adapted to analyze the data of γ-ray spectrum delivered from the multichannel pulse height analyzer 22 and to calculate the concentration of the radioactivity for each radionuclide. To explain in more detail, in the analysis of the γ-ray spectral data, the position (i.e. the number of the channel) and the area of the peak in the spectrum respectively indicate the type of the radionuclide and the intensity of the radioactivity (the intensity is normally represented by a unit of $\eta$Ci). The concentration of radioactivity is then calculated taking the effective volume of the sampling tube into account, which is normally given with a unit of $\mu$Ci/ml.

It is often necessary to obtain the radioactive concentration for particular radionuclides, especially in the radioactive analysis of the coolant water of a nuclear reactor. To this end, the data such as the objective radionuclide and its γ-ray energy are previously input to the data processing system. The result of the analysis is then fed to a recording device 24 to be output therefrom in the form of, for example, printed numerals.

Although not shown in the drawings, it is preferable to shield the radiation detector and the sampling material with a γ-ray shielding material such as lead, so that the detection of radiation may be less affected by the background.

Hereinafter, the manner of operation of the apparatus will be described in detail, with reference to the above explained embodiment.

The measurement may be divided into two stages, i.e. a preparatory stage in which a suitable sampling tube is selected to meet the level of the radiation and a stage for quantitative and qualitative analyses. The selection of the sampling tube, i.e. the selection of the volume of the sample, is for presenting a measuring condition which provides a suitable counting rate for the measurement of radiation which varies as the time elapses. At first, a start signal is issued from the sequence controller 25 to actuate the valves 6 and 7 of the sampling tube 2 so as to switch the sampling tube from the condition being supplied with the cleaning water to the condition being supplied with the sample coolant water. Then, the total radiation of the sampling tube 2 or the radiations of preselected radionuclides such as $^{85}$Kr and $^{131}$I are measured by the semiconductive radiation detector 12 in a short period of time (which is typically several minutes). The measured level of radiation is then discriminated by the data processing system 23 into one of the predetermined classes of radioactive level, the number of which corresponds to that of the sampling tubes. The discrimination signal is then input to the sequence controller 25 which then issues a signal to actuate the valves 4, 5 of the sampling tube 1 or the valves 8, 9 of the sampling tube 3, when either one of the sampling tubes 1 or 3 is discriminated to be appropriate, so that the discriminated and selected sampling tube may be supplied with the sampling coolant instead of the cleaning water. At the same time, the sampling tube 2 is switched to the cleaning water.

A volume of the sample coolant water which is quantatively and qualitatively optimum for the radiation is thus selected to provide most accurate measuring. After this preparatory stage of selecting the sample tube, the radiation is measured quantatively and qualitatively for each of the radionuclides by means of the semiconductive radiation detector 12, the multichannel pulse height analyzer and the data processing system, in cooperation. The measuring time is controlled in accordance with the level of the radiation of the sample.

It will be understood from the foregoing description that the apparatus of the invention can provide an efficient and accurate measuring, well suited to radioactivity which varies as the time elapses.

In the above described embodiment, the monitoring of the level of radiation is performed by the means which perform also the quantitative and qualitative analysis of all radionuclides. However, it is possible to use separate monitoring means for monitoring the level of the radiation. These monitoring means may be constituted by, for example, a GM tube or a NaI scintillation counter, a counting rate meter and a radiation level discriminator. An equivalent effect is obtained when the above-noted separate monitoring means are combined with a bypass pipe adapted to pass the coolant water constantly, bypassing the sampling tubes.

The number and the sizes of the sampling tubes are determined in accordance with the practical or actual level of radioactivity. Although only three sample tubes are incorporated in the described embodiment, this is not exclusive, and it is possible and preferred to provide one sample tube for each figure of number of possible numerical range of radioactive level. The cross-sectional area of the sampling tube may be selected from a range between 0.1cm$^2$ and 1,000cm$^2$, which provides a measurable range of more than four figures of numerals.

At the same time, it is to be noted that the equispaced positioning of the sampling tubes in the vicinity of the radiation detector as shown in FIG. 1 is not limited thereto and other positioning of the sampling tube may be utilized.

In addition, it is noted that the apparatus of the invention can be applied to systems other than the described cooling system, for example to the water disposal system of a nuclear reactor, or even to other plant in which the measuring of the radioactive concentration is required.

It is preferred to interpose a collimator which is conventionally used in radioactive measuring, between the sampling tube and the radiation detector, since the measurable range is easily widened and the effective volume of the sampling tube is clarified by adjusting the area of the opening of the collimater in the longitudinal direction of the sampling tube.

The advantageous effect provided by the invention is summarized as follows:

1. An apparatus for measuring the radioactive concentration in the coolant having prompt response is provided which remarkably contributes to a safer and more efficient operation of a nuclear reactor.

2. The variation in radioactive concentration of the coolant over a wide range can be automatically detected and measured by a single apparatus.

3. Since no release of dilute gases takes place during the measuring, an improved reliability is obtained in evaluation of the density of the dilute gases.

4. Since the measuring is performed automatically within a closed circuit, no radioactive contamination of the environment and the operators results.

5. The time required for the measuring is greatly reduced as compared with the conventional measuring method.

It is remarkable that these advantages in combination provide a highly effective observation means for the condition of working nuclear reactor or other plants.

While we have shown and described a single embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. An apparatus for automatically measuring concentration of radioactivity in a radioactive fluid comprising:
   at least two sampling tubes of different cross sectional areas connected to a fluid system in which the radioactive fluid flows,
   valve means provided at inlet and outlet sides of said at least two sampling tubes for selectively feeding to said at least two sampling tubes one of the radioactive fluid and a non-radioactive fluid,
   control means for controlling said valves to permit the radioactive fluid to be fed to at least two sampling tubes,
   radiation detector means responsive to the radioactive fluid in said at least two sampling tubes for detecting the radiation from the fluid and providing a radiation output signal in accordance therewith, and
   processing means responsive to the radiation signal of said radiation detector means for providing at least an indication of the concentration of radioactivity in the radioactive fluid.

2. An apparatus according to claim 1, wherein said processing means includes counting means for providing spectral data in accordance with the radiation signal of said radiation detector means, said counting means counting the number of pulses corresponding to respective ones of predetermined classes of energy level in the radiation signal provided by said radiation detector means, and data processing system means for sorting radionuclides from the spectral data provided by said counting means, said data processing system means calculating the concentrations of radioactivity for at least one of the radionuclides from the spectral data and the effective volume of said sampling tubes, said data processing system means further being arranged for discriminating the level of radioactivity of the fluid for classifying the radioactivity into a corresponding number of classes of level to the number of sampling tubes, and for providing a discriminating output signal to said controlling means.

3. An apparatus according to claim 2, wherein said controlling means is responsive to the discriminating signal of said data processing system means for controlling said valves of said respective sampling tubes.

4. An apparatus according to claim 2, wherein said counting means includes a multichannel pulse height analyzer for transducing the radiation signal from said radiation detector means into pulse heights, for sorting the pulse heights into a plurality of channels, and for counting the number of pulses corresponding to each of the channels.

5. An apparatus according to claim 2, wherein said data processing system means is arranged for determining the type of radionuclide from the position of a peak appearing in a $\gamma$-ray spectrum and for calculating the radioactivity from the area of the peak, said data processing system means calculating the concentration of radioactivity in accordance with the effective volume of the sampling tube.

6. An apparatus according to claim 2, wherein the respective diameters of said sampling tubes are in inverse proportion to the intensity of radioactivity.

7. An apparatus according to claim 2, wherein said radiation detector means comprises a Ge (Li) $\gamma$-ray detector.

8. An apparatus according to claim 2, further comprising recording means for displaying the result of the measurement of the data processing system means.

9. An apparatus according to claim 2, wherein the radioactive fluid flows in a pipe, said sampling tubes being connected to said pipe for sampling the radioactive fluid flowing therethrough.

10. An apparatus according to claim 9, further comprising means for supplying the non-radioactive fluid to said valve means on the inlet side of said sampling tubes.

11. An apparatus according to claim 10, wherein said pipe is a part of a fluid system of a nuclear power plant.

12. An apparatus according to claim 11, wherein said fluid system is one of a cooling system and a discharge system of said nuclear power plant.

13. An apparatus according to claim 11, further comprising discharge means connected to said valve means at the outlet side of said sampling tubes.

14. An apparatus for automatically measuring concentration of radioactivity in a radioactive fluid comprising:
   radiation detector means for detecting radiation from the fluid and providing a radiation output signal,
   at least two sampling tubes of different cross-sectional areas disposed in the vicinity of said radiation detector means,
   valve means provided at inlet and outlet sides of said sampling tubes for selectively feeding to said sampling tubes one of the radioactive fluid and a non-radioactive fluid,
   controlling means for controlling said valve means to permit the radioactive fluid to be fed to at least one of said sampling tubes,
   means for counting the number of pulses belonging to respective ones of predetermined classes of energy level in the radiation signal from said radiation detector means, and
   data processing system means for sorting radionuclides from a spectral data provided by said counting means and for calculating concentrations of radioactivity for at least one of the radionuclides from the spectral data and the effective volume of said sampling tubes, said data processing system means being adapted to discriminate the level of radioactivity of the fluid for classifying the radioactivity into a corresponding number of classes of level to the number of sampling tubes, and to provide a discriminating signal to said controlling means.

15. An apparatus according to claim 14, wherein said counting means includes a multichannel pulse height analyzer for transducing the radiation signal from said radiation detector means into pulse heights, for sorting the pulse heights into a plurality of channels, and for then counting the number of pulses belonging to each of the channels.

16. An apparatus according to claim 14, wherein said data processing system means determines the type of radionuclide from the position of a peak appearing in a γ-ray spectrum and for calculating the radioactivity from the area of the peak, said data processing system means calculating the concentration of radioactivity in accordance with the effective volume of said sampling tube.

17. An apparatus according to claim 16, wherein the respective diameters of said sampling tubes are in inverse proportion to the intensity of radioactivity.

18. An apparatus according to claim 14, wherein said radiation detector means comprises a Ge (Li) γ-ray detector.

19. An apparatus according to claim 14, further comprising recording means for displaying the result of the measurement of the radioactivity.

20. An apparatus according to claim 9, wherein the radioactive fluid flows in a pipe, said sampling tubes being connected to said pipe for sampling the fluid flowing therethrough.

21. An apparatus according to claim 15, wherein said pipe is a part of a fluid system of a nuclear power plant having the radioactive fluid circulating therethrough.

22. An apparatus according to claim 16, wherein said fluid system is one of a cooling system and a disposal system of the nuclear power plant.

* * * * *